United States Patent
Croom et al.

(10) Patent No.: US 6,198,990 B1
(45) Date of Patent: *Mar. 6, 2001

(54) METHODS FOR ACCURATELY INSERTING SATELLITE CONSTELLATIONS INTO COMMON ORBIT PLANES

(75) Inventors: Christopher Allen Croom, Redondo Beach; William Allen Snyder, Calabasas, both of CA (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/492,888

(22) Filed: Jan. 27, 2000

Related U.S. Application Data

(63) Continuation of application No. 09/095,257, filed on Jun. 10, 1998.

(51) Int. Cl.$^7$ ........................................... B64G 1/10
(52) U.S. Cl. ................................. 701/13; 701/226
(58) Field of Search ........................... 701/226, 13, 220; 342/355, 356

(56) References Cited

U.S. PATENT DOCUMENTS

| | | | | |
|---|---|---|---|---|
| 3,836,969 | * | 9/1974 | Bond et al. | 342/356 |
| 4,757,964 | * | 7/1988 | McIntyre | 244/164 |
| 5,199,672 | * | 4/1993 | King et al. | 244/158 R |
| 5,267,167 | * | 11/1993 | Glickman | 701/226 |
| 5,687,084 | * | 11/1997 | Wertz | 701/226 |
| 5,716,029 | * | 2/1998 | Spitzer et al. | 244/158 R |
| 5,813,633 | * | 9/1998 | Anzel | 244/169 |

OTHER PUBLICATIONS

Allan, R.R., et al., "The long–period motion of the plane of a distant circular orbit", Proceedings Royal Society, 1964, vol. 280, pp. 97–109.*

* cited by examiner

Primary Examiner—Michael J. Zanelli
Assistant Examiner—Eric M. Gibson
(74) Attorney, Agent, or Firm—Terje Gudmestad

(57) ABSTRACT

Methods are provided for accurate insertion of a constellation of satellites into a common orbit plane with a mean inclination θ. In an embodiment of the invention, an initial satellite is inserted on an initial insertion date and, for each of subsequent satellites, a respective orbit insertion date is selected. With reference to the latter date, the initial insertion RAAN is updated to find a current RAAN. This updating is accomplished with knowledge of a regression rate of the initial satellite's orbit normal about a Q vector. With reference to the Q vector's inertial position, an instantaneous inclination that corresponds to the mean inclination θ and the updated RAAN is then derived. Finally, the subsequent satellite is injected into an orbit having the instantaneous inclination and the current RAAN.

9 Claims, 7 Drawing Sheets

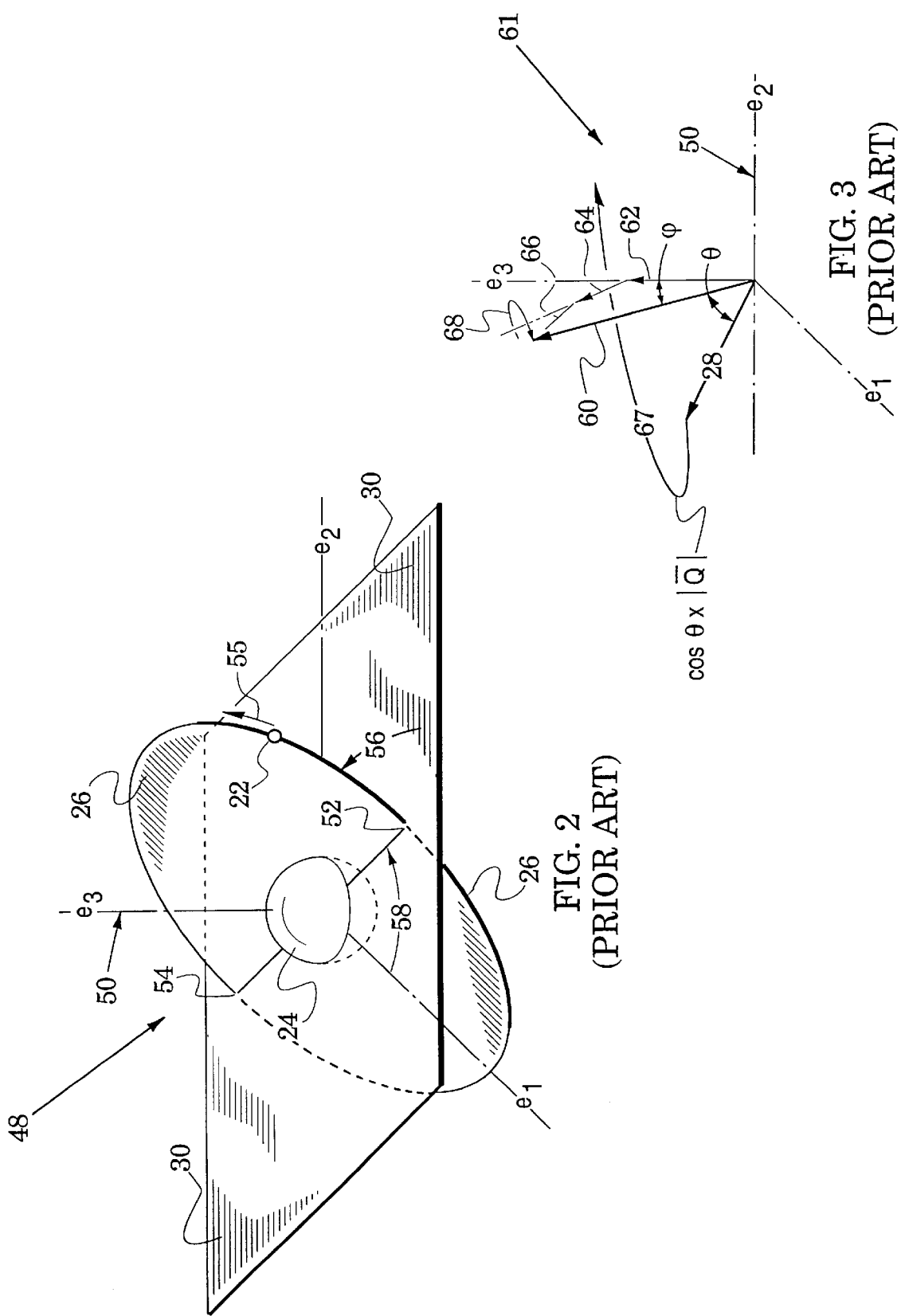

| Perturbing Celestial Member | Magnitude of Q vector component | 24 hour satellite | 6 hour satellite |
|---|---|---|---|
| Earth | $\omega_0 = 35.58\ (n/a^2)$ deg/yr | 4.900 deg/yr | 124.5 deg/yr |
| Sun | $\omega_1 = 4.65/n$ deg/yr | 0.738 deg/yr | 0.184 deg/yr |
| Moon | $\omega_2 = 10.15/n$ deg/yr | 1.611 deg/yr | 0.403 deg/yr |

METHODS FOR ACCURATELY INSERTING SATELLITE CONSTELLATIONS INTO COMMON ORBIT PLANES

This application is a continuation of Ser. No. 69/095,257, filed Jun. 10, 1998.

BACKGROUND OF THE INVENTION

1. Field of the Invention

The present invention relates generally to satellites and more particularly to satellite orbits.

2. Description of the Related Art

The orbit diagram 20 of FIG. 1 illustrates relationships between movements of a satellite, the earth, the sun and the moon. In the diagram, a satellite 22 orbits the earth 24 in an orbit plane 26. An orbit axis that is orthogonal to and centered in the orbit plane is typically referred to as an orbit normal 28. Similarly, the earth rotates about an equatorial pole 32 which is normal to an equatorial plane 30.

The sun appears to move about the earth 24 in an ecliptic plane 36 which has an ecliptic pole 38 that is tilted ~23.44 degrees from the equatorial pole 32. The sun 34 is shown at two exemplary positions, a winter solstice position 34W and a summer solstice position 34S. Similarly, the moon 40 is shown at two positions 40A and 40B which respectively represent its farthest and closest approach to the equatorial plane 30.

The moon orbits the earth in a lunar orbit plane 42 which has a lunar orbit normal 44. The lunar orbit normal 44 is canted ~5.14 degrees from the ecliptic pole 38 and regresses (i.e., rotates clockwise as viewed from north of the ecliptic plane 36) about that pole with a period of ~18.6 years. This regression is indicated by movement arrow 45 and the lunar orbit normal 44 is shown in two extreme positions 44A and 44B that correspond to extreme orientations 42A and 42B of the lunar orbit plane 42.

The celestial diagram 48 of FIG. 2 relates the orbit plane 26 and the equatorial plane 30 to an equatorial coordinate system 50 (the plane 26 is shown at a greater angle in FIG. 2 for clarity of illustration). The system 50 has 3 orthogonal axes; an $e_3$ axis coaxial with the equatorial pole (32 in FIG. 1), an axis $e_1$ that is oriented through the vernal equinox (and points generally to Aries) and a third orthogonal axis $e_2$. The right ascension of a celestial body is its angle (taken counterclockwise from above the $e_1$–$e_2$ plane) from the axis $e_1$ and the declination of a celestial body is its angle from the $e_1$–$e_2$ plane (alternatively, the body's codeclination is its angle from the $e_3$ axis).

In reference to the equatorial plane 30, the orbit plane 26 has an ascending node 52 where the satellite 22 crosses to the upper side of the equatorial plane and a descending node 54 where it crosses to the lower side (satellite motion is indicated by movement arrow 55). With respect to the coordinate system 50, an orbit plane's inertial position is typically specified by its inclination I and its right ascension of the ascending node (RAAN). In FIG. 2, the inclination I is the angle 56 between the equatorial plane 30 and the orbit plane 26 and the RAAN is the angle 58.

The earth, the sun and the moon all perturb a satellite's orbit plane. The dominant sources of these orbit-plane perturbations are the oblateness (i.e., polar flattening) of the earth and the gravitational-gradients generated by the sun and the moon. Various references (e.g., R. R. Allan and G. E. Cook, "The long-period motion of the plane of a distant circular orbit", *Proceedings Royal Society*, 1964, vol 280, pp. 97–109) have shown that these perturbations cause an orbit normal to regress about a theoretical vector that is hereinafter referred to as a Q vector.

The orbit normal 28 and a Q vector 60 are shown in the diagram 61 of FIG. 3 with reference to the equatorial coordinate system 50 of FIG. 2. The Q vector 60 has three vector components; a first fixed vector 62 associated with earth-induced perturbations and oriented coaxially with the $e_3$ axis, a second fixed vector 64 associated with sun-induced perturbations and oriented parallel to the ecliptic pole (38 in FIG. 1) and a rotating vector 66 associated with moon-induced perturbations. The latter vector is parallel to the lunar orbit normal (44 in FIG. 1) and, accordingly, it cones about the vector component 64 at an angle of ~5.14 degrees and with a period of ~18.6 years (for clarity of illustration, the angle is considerably increased in FIG. 3). As shown in FIG. 3, the resultant Q vector 60 tilts by an offset angle φ from the $e_3$ axis and the equatorial pole (32 in FIG. 1).

If the orbit normal 28 is initially tilted from the Q vector 60 by an angle θ, the combined perturbations cause the orbit normal to regress, as illustrated by the motion arrow 67, about the Q vector 60 with a constant angle θ and at an angular rate equal to cosine θ times the magnitude of the Q vector (this rate is also shown in FIG. 3). As indicated by the motion arrow 68, the Q vector 60 repetitively traces a path with an ~18.6 period and, accordingly, its magnitude and direction vary over that period. The magnitudes of the vector components 62, 64 and 66 are functions of the semimajor axis of the satellite's orbit and the satellite's mean motion (i.e., a function of the satellite's altitude).

Because of the offset angle φ regression of the orbit normal 28 about the Q vector 60 effects changes in the orbit plane's inclination (56 in FIG. 2). Satellite missions generally require that the inclination be controlled within a specified band. If correction is required, inclination control is typically effected through the application of corrective thruster forces to the satellite. In particular, inclination corrections are accomplished with thruster forces that are directed normal to the orbit plane and inclination corrections are the dominant users of thruster fuel. Because reduction of fuel usage permits an increase of satellite payload and revenue, extensive efforts have been directed to the reduction or elimination of thruster fuel use in control of orbit plane inclination.

Inclination control is particularly important in systems (e.g., communication systems) that require a constellation of satellites to occupy a single orbit plane. Significant savings in thruster fuel and operational complexity can be realized in these systems if the satellites can be inserted into orbit so that the need for inclination control is reduced over the system's lifetime.

SUMMARY OF THE INVENTION

The present invention is directed to methods for accurately inserting a constellation of satellites into a common orbit plane with a mean inclination θ. This accurate insertion can reduce the need for thruster corrections of orbit inclination. Because the accuracy of the methods increases as the period of the common orbit is reduced, they may even eliminate the need for thruster corrections in some satellite constellations.

The methods are practiced with an operational inertial position of the Q vector. In different method embodiments, this operational position may be the instantaneous position at each satellite's insertion date or various averages of the Q vector's position.

In one method embodiment, a respective orbit insertion date and a respective RAAN are selected for an initial satellite. For each subsequent one of the satellites, a respective orbit insertion date is selected that is delayed from the orbit insertion date of the first satellite by a respective elapsed time. For each subsequent one of the satellites, the RAAN of the first satellite is updated with its respective regression rate and the subsequent satellite's respective elapsed time to realize a respective RAAN for the subsequent satellite.

With reference to the operational inertial position of the Q vector, an instantaneous orbit inclination is then derived for each of the satellites that corresponds to the mean inclination $\theta$ and that satellite's respective RAAN. Each of the satellites is then inserted on its respective orbit insertion date into a respective orbit with that satellite's respective instantaneous inclination and respective RAAN.

The novel features of the invention are set forth with particularity in the appended claims. The invention will be best understood from the following description when read in conjunction with the accompanying drawings.

BRIEF DESCRIPTION OF THE DRAWINGS

FIG. 2 is a perspective view of the equatorial plane and an orbit plane of FIG. 1;

FIG. 3 is a view similar to FIG. 2 that illustrates relationships of an orbit normal of FIG. 1 to a Q vector;

DETAILED DESCRIPTION OF THE PREFERRED EMBODIMENTS

Orbit insertion methods of the present invention facilitate the accurate insertion of a constellation of satellites into a common orbit plane that has a mean inclination $\theta$. In these methods, an initial satellite is injected into the common orbit plane on an initial orbit insertion date with an initial RAAN.

For each of subsequent satellites, an orbit insertion date is selected. With reference to this date, the initial insertion RAAN is updated to find a current RAAN. This updating is accomplished with knowledge of a regression rate of the initial satellite's orbit normal about a Q vector. With reference to the Q vector's inertial position, an instantaneous inclination that corresponds to the mean inclination $\theta$ and the updated RAAN is then derived. Finally, the subsequent satellite is injected into an orbit having the instantaneous inclination and the current RAAN.

To enhance a more detailed description of the invention's methods, it is preceded by the following investigation of specific Q vector components, orbit normal regression rates and relationships between an orbit's inclination and an offset between the orbit's orbit normal and the Q vector.

Figures 4, 5:
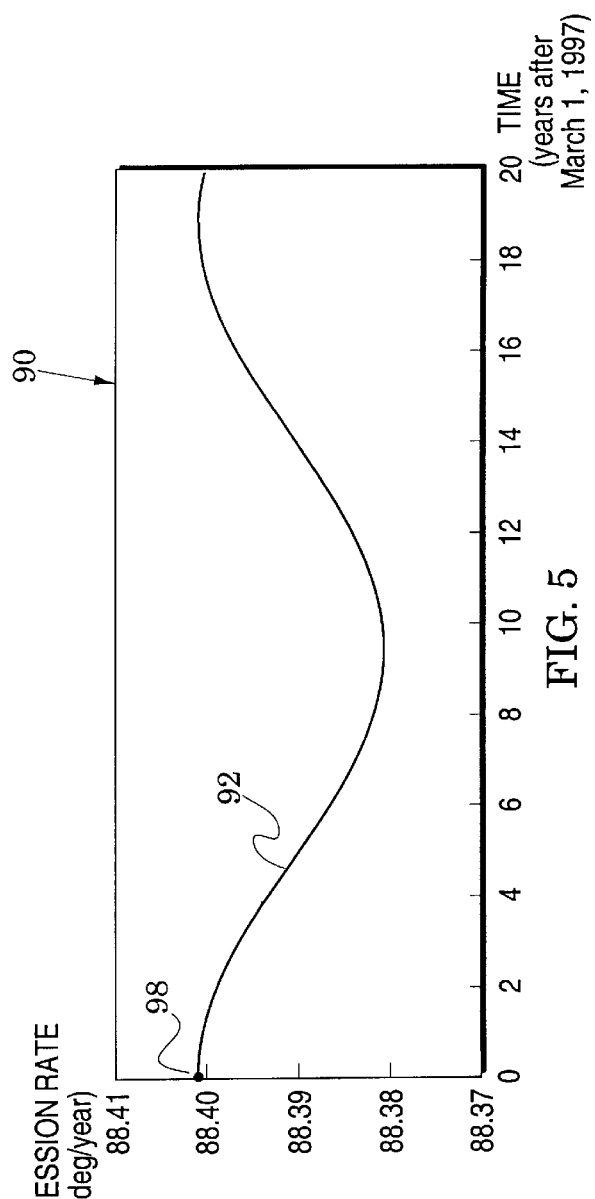
FIG. 4 is a table which compares magnitudes of Q vector components for exemplary satellites that have different periods.
FIG. 5 is a graph which shows orbit normal regression rate for an exemplary satellite period.

This investigation begins with the table 80 of FIG. 4 which illustrates magnitudes of the Q vector components 62, 64 and 66 of FIG. 3. The earth component 62 has a magnitude $\omega_0$ that is approximately $3nJ_2/2a^2$ or approximately $35.58 \text{ n}/a^2$ degrees/year in which n is a satellite's mean motion in degrees/year, $J_2$ is the second order zonal harmonic (higher order terms have negligible effect) and a is the semimajor axis of a satellite's orbit (expressed in earth radius units (eru)).

If earth were the only orbit-perturbing celestial body and if an orbit normal were initially tilted by an angle $\theta$ from the vector component 62, it would regress about that vector component by a constant angle $\theta$ and with an angular rate of $\omega_0$.

The sun and moon vector components 64 and 66 have magnitudes $\omega_1$ and $\omega_2$ that are expressed as $3\mu/\{(4na^3(1-e^2)^{3/2}\}$ in which $\mu$ is the product of the gravitational constant g and the mass of the perturbing body and a and e are the semimajor axis and ellipticity of the perturbing body's orbit. Accordingly, as $e \ll 1$ for each of the sun and the moon, $\omega_1 \sim 4.65/n$ degrees/year and $\omega_2 \sim 10.15/n$ degrees/year.

Similar to earth perturbations, if the sun were the only orbit-perturbing celestial body and if an orbit normal were initially tilted by an angle $\theta$ from the vector component 64, it would regress about that vector component by a constant angle $\theta$ and with an angular rate of $\omega_1$. Finally, if the moon were the only orbit-perturbing celestial body and if an orbit normal were initially tilted by an angle $\theta$ from the vector component 66, it would regress about that vector component by a constant angle $\theta$ and with an angular rate of $\omega_2$.

The magnitude of $\omega$ is approximately inversely proportional to the 7/3rd power of a satellite's orbit period. In contrast, $\omega_1$ and $\omega_2$ are directly proportional to the orbit period. Therefore, reducing a satellite's period (and, hence, its altitude) increases the earth's perturbing effect relative to those of the sun and the moon.

This is exemplified in table 80 by two exemplary orbits. The first is that of a geostationary satellite which has a period of 24 hours and, therefore, an altitude of ~35,786 kilometers. The second is that of a satellite having a period of 6 hours and, therefore, an altitude of ~10,386 kilometers. Note that the magnitude of the earth's Q vector component (component 62 in FIG. 2) is much more dominant for the 6 hour satellite than it is for the 24 hour satellite. Accordingly, the mean value of the offset angle $\phi$ in FIG. 2 is ~7.11 degrees for a 24 hour satellite and, in contrast, the mean offset is reduced to ~0.107 degree for a 6 hour satellite.

Figure 1:
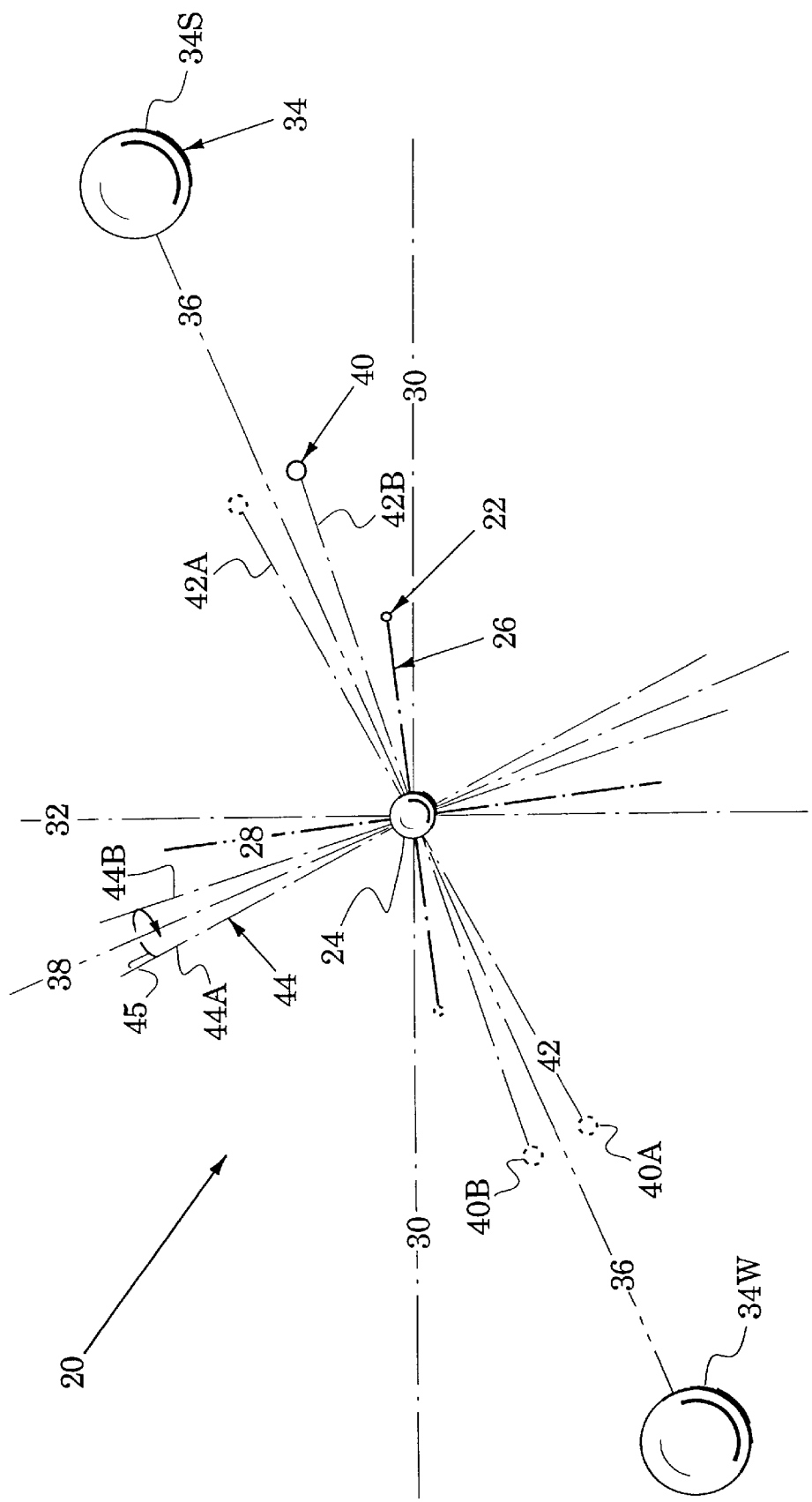
FIG. 1 is a side elevation view of the equatorial plane which relates a satellite's orbit to celestial movements of the earth, the sun and the moon.

As mentioned above, a satellite's orbit normal will regress about a Q vector with a regression rate equal to cosine $\theta$ times the magnitude of the Q vector in which $\theta$ is the angle between the orbit normal and the Q vector (e.g., see FIG. 3). Because the $e_1$ axis of FIG. 3 points towards the vernal equinox, it is apparent from FIG. 1 that the sun's Q vector component 64 is located at right ascension 270 degrees and codeclination ~23.44 degrees. As the moon's Q vector component 66 cones about the vector component 64, the magnitude of the Q vector varies sinusoidally. Minimum and maximum magnitudes occur as the Q vector crosses a plane associated with right ascension 270 degrees. Accordingly, the regression rate will have the same variation.

In particular, the regression rate variation is illustrated by plot 92 in graph 90 of FIG. 5 for an exemplary 6 hour satellite that has a mean inclination of 45°. On Mar. 1, 1997, the Q vector had a magnitude maximum as it crossed the plane associated with right ascension 270 degrees. Thus, the plot 92 begins with a maximum rate at 0 years and reaches a minimum ~9.3 years later as the Q vector again crosses this plane. In this example, the mean regression rate is ~88.39 degrees/year and the rate varies ~0.02 degrees/year from the mean value. With this mean regression rate, the orbit normal rotates about the Q vector with a period of ~4.07 years.

Figure 6:
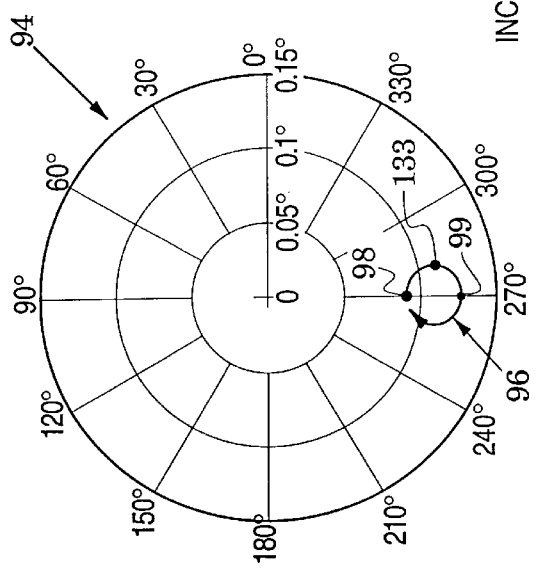
FIG. 6 is a polar projection of a unit sphere that illustrates a path traced by the Q vector of FIG. 3 for an exemplary satellite period.

Movement of the Q vector is shown in the graph 94 of FIG. 6 which is a polar projection of a spherical coordinate system and is arranged to look down along the $e_3$ axis of FIG. 3. In this graph, a plot 96 traces the tip of the Q vector (60 in FIG. 3) from a point 98 that corresponds to a similar point 98 in the plot 92 of FIG. 5 (i.e., at the date of Mar. 1, 1997). The plot 96 shows progression of the tip as it completes one 18.6 year period. With an exemplary regression period of ~4.07 years, an orbit normal will cone about the Q vector ~4.5 times as the Q vector completes its 18.6 year period.

The plot 96 illustrates that the Q vector offset from the $e_3$ axis (the offset angle φ in FIG. 3) begins at ~0.092° at the point 98. When the plot 96 again crosses the right ascension 270° plane at the point 99, the offset is ~0.122°. The plot 96 has a mean offset of ~0.107°.

Figure 7:
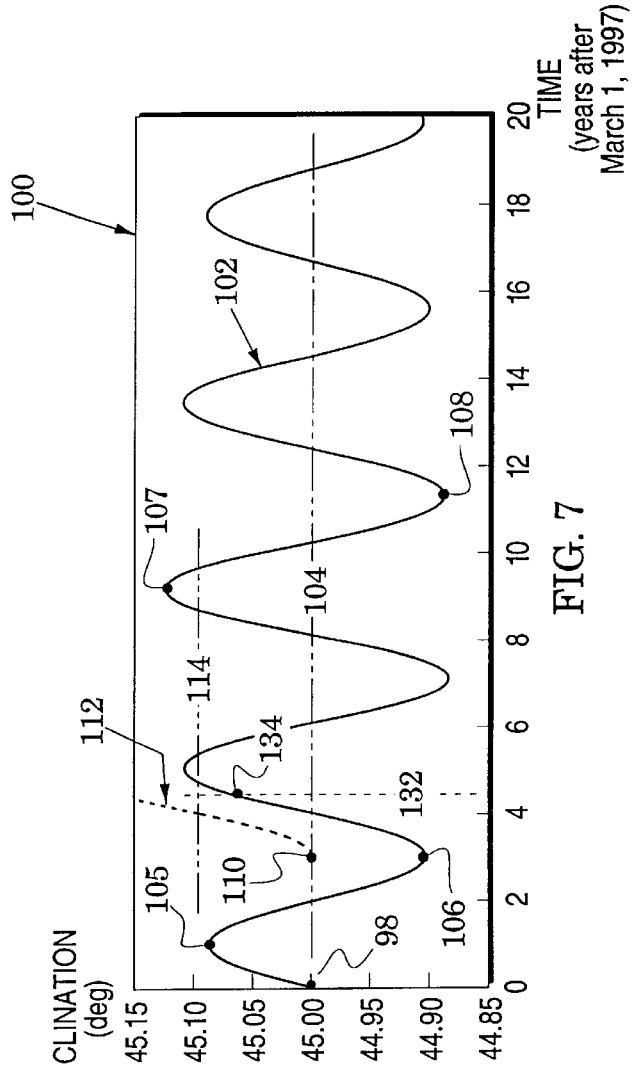
FIG. 7 is a graph which shows instantaeous inclination over a Q vector's period for an exemplary satellite period.

The combined effects of the offset angle φ, the 18.6 regression period of the Q vector (60 in FIG. 3) and the 4.07 year period of the orbit normal (28 in FIG. 3) are summarized in the graph 100 of FIG. 7. This graph illustrates a plot 102 of inclination of the orbit plane (the angle 56 in FIG. 2) when the value of 45° has been arbitrarily selected for the constant angle θ of FIG. 3. Equivalently, the plot illustrates tilt of the orbit normal from the $e_3$ axis of FIG. 3 or the equatorial pole 32 of FIG. 1.

The inclination plot 102 has a sinusoidal form with a varying amplitude. In particular, it has a mean inclination shown as the broken line 104, peak-to-peak minimums at year 0 and year 18.6 and a peak-to-peak maximum in the region of year 9.3.

Year 0 begins at Mar. 1, 1997 which is also the point 98 in FIG. 6. Because the offset angle φ (see FIG. 3) is at a minimum of ~0.092° at this time, the sinusoidal inclination also has peak amplitudes of ~0.092° at this time. Between years 0 and 4, the orbit normal (28 in FIG. 3) has cycled about the Q vector so that the inclination 102 has a maximum amplitude at point 105 followed by a minimum amplitude at point 106. The minimum and maximum occur as the orbit normal is respectively in the regions of right ascension 90° and right ascension 270°.

When the Q vector has reached point 99 in FIG. 6, the offset angle φ has reached a maximum of ~0.122° and, as a result, the instantaneous inclination 102 has peak amplitudes of ~0.122° in the region of 9.3 years. Between years 8 and 12, the orbit normal has cycled again about the Q vector so that the inclination 102 has a maximum amplitude at point 107 followed by a minimum amplitude at point 108. The minimum and maximum again occur as the orbit normal is in the regions respectively of right ascension 90° and right ascension 270°.

As mentioned above, small short term perturbations by the earth, sun and moon are added to the long term perturbations illustrated in FIG. 7. In this example of a 6 hour satellite, an earth-induced (by the earth's oblateness) three hour cycle having an amplitude of ~0.0034° and a moon-induced 14 day cycle having an amplitude of ~0.0018° would be added to the inclination plot 102. Because these short term perturbations are reduced from long-term perturbations by at least an order of magnitude, they can generally be ignored.

In accordance with the teachings of the present invention, it is noted that the inclination plot 102 cycles about a mean inclination 104 and the instantaneous inclination at any particular time is a function of the Q vector's inertial position and the orbit normal's inertial position. It is further noted that the mean inclination 104 is substantially the constant tilt angle θ between the orbit normal and the Q vector that is shown in FIG. 3. The orbit normal's inertial position is a function of its mean inclination, the magnitude of the Q vector and the orbit plane's RAAN at the time of orbit insertion.

With respect to a target inclination 104 and in the absence of inclination corrections (e.g., by application of thruster force normal to the orbit plane), the inclination plot 102 represents the most accurate positioning of an orbit plane. If it is desired to accurately insert a second satellite into the same orbit plane at approximately year 3, for example, it should be inserted at that time with an instantaneous inclination 106 in FIG. 7. Accordingly, the inclination of the second satellite will then follow the same plot 92 as does the initial satellite.

If, instead, the second satellite were inserted at that time with the target inclination 104 (as indicated by point 110), its inclination would then follow a different sinusoidal path 112 with a different mean inclination 114. That is, insertion of a plurality of satellites on different dates with an instantaneous inclination equal to a target inclination will result in each satellite's inclination varying about a different mean inclination. The orbit planes of the satellites will be less accurately positioned than if they were inserted in accordance with the methods of the invention.

Figure 8:
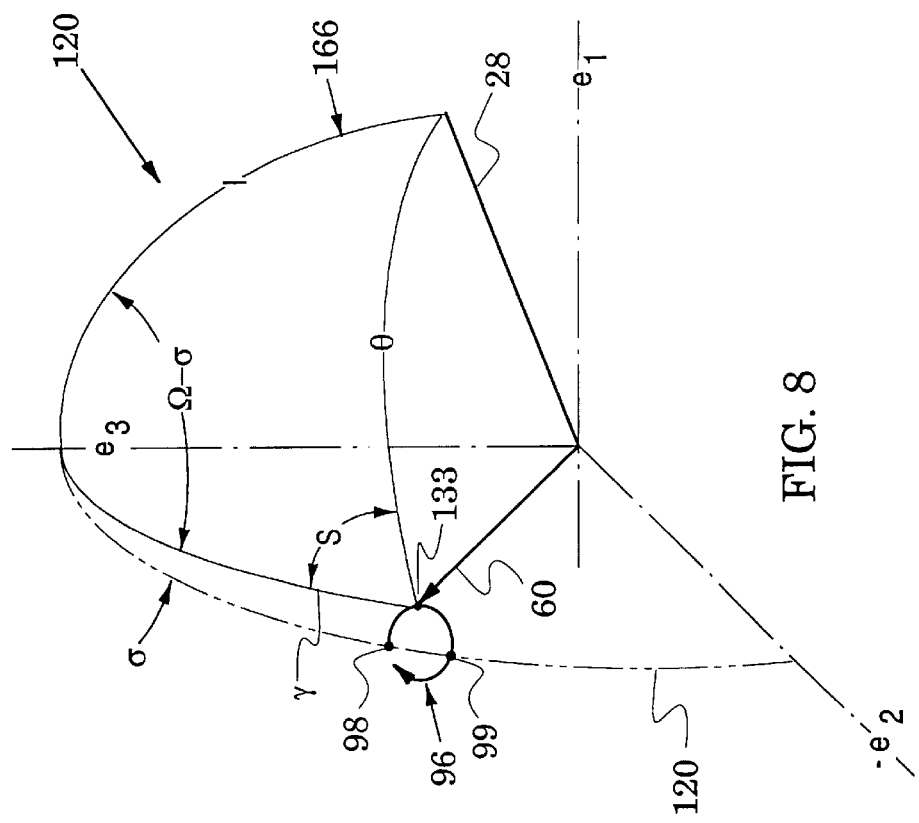
FIG. 8 is a perspective view of a spherical coordinate system that illustrates other process steps of the present invention.

These methods require attention to the RAAN of each satellite's orbit plane at the time of orbit insertion. This can be understood with reference to FIGS. 8 and 9. FIG. 8 is a diagram 120 that illustrates the Q vector 60 and the orbit normal 28 with respect to a special coordinate system based upon the coordinate system 50 of FIG. 3. The path 96 of the Q vector's tip is shown as it was previously shown in FIG. 6. The tip is inertially located by its codeclination γ and by an angle σ which is the tip's right ascension less 270°. The orbit normal 28 has an inclination I from the $e_3$ coordinate and is tilted from the Q vector by the constant angle θ. The spherical dimension between the codeclination γ and the constant angle θ is a regression angle S.

Figure 9:
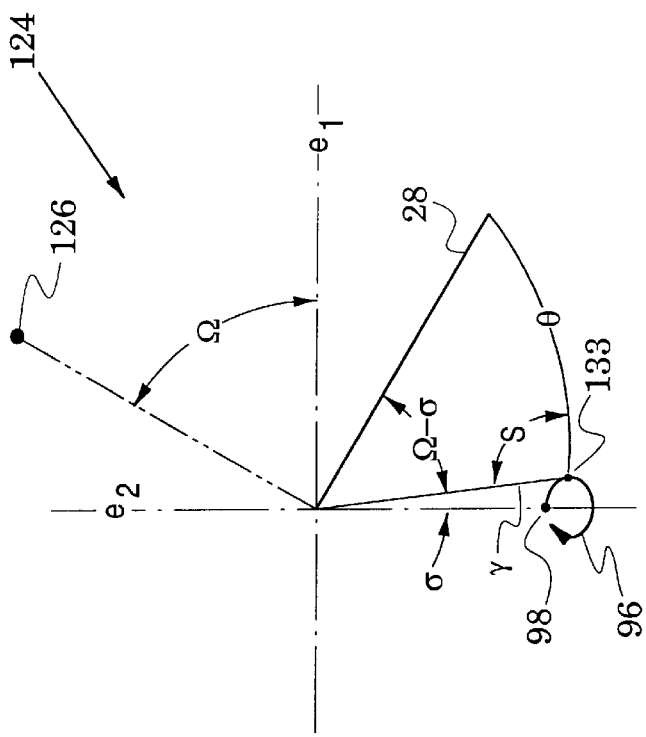
FIG. 9 is a top plan view of FIG. 8 which shows relationships between the orbit normal and the RAAN of an exemplary orbit plane.

FIG. 9 has like elements of FIG. 8 indicated by like reference numbers in a diagram 124. This diagram looks down along the axis $e_3$ of FIG. 8 towards the $e_1$-$e_2$ plane. In addition, the orbit plane's ascending node is shown as element 126. The ascending node has a RAAN Ω and it and the orbit normal are in quadrature (i.e., 90° separation) with the ascending node leading the orbit normal. Accordingly, the angle in FIG. 8 between the inclination I and the codeclination γ is the angle Ω-σ.

As the Q vector 60 repetitively traces the path 96 with an ~18.6 year period, its codeclination γ and angle σ change accordingly. The orbit normal 28 regresses about the Q vector 60 with constant angle θ and an angular rate of cos θ times the magnitude of the Q vector. The regression angle S specifies this movement of the orbit normal 28 with respect to the Q vector and the inclination I and the RAAN Ω inertially locates the orbit normal 28.

With reference to FIG. 7, it was previously stated that to insert a second satellite into an orbit with the mean inclination of a common orbit plane, it is necessary to insert it with an instantaneous inclination that corresponds to the mean inclination and the orbit normal's position at the orbit insertion date of the second satellite.

For illustrative purposes, it is assumed that an initial satellite was inserted into orbit at the point 98 in FIG. 7 and that a second satellite's insertion date is at year ~4.6 which is indicated in FIG. 7 by the broken line 132 and in FIG. 8 by the point 133. It is further assumed that the insertion RAAN of the first satellite has progressed to ~60° at the second satellite's insertion date. Accordingly, the right ascension of the orbit normal 28 is ~330° and the instantaneous inclination is, therefore, at the point 134 in FIG. 7.

To enhance accuracy, therefore, the second satellite is inserted into orbit with an instantaneous inclination given by the point 134 and a RAAN of ~60°. This will cause the second satellite's inclination to follow the same inclination plot 102 in FIG. 7 that is associated with the first satellite. Both satellites will orbit with the same mean inclination 104, i.e., inclination variations between them will be the least obtainable without the use of thruster corrections.

Figure 10:
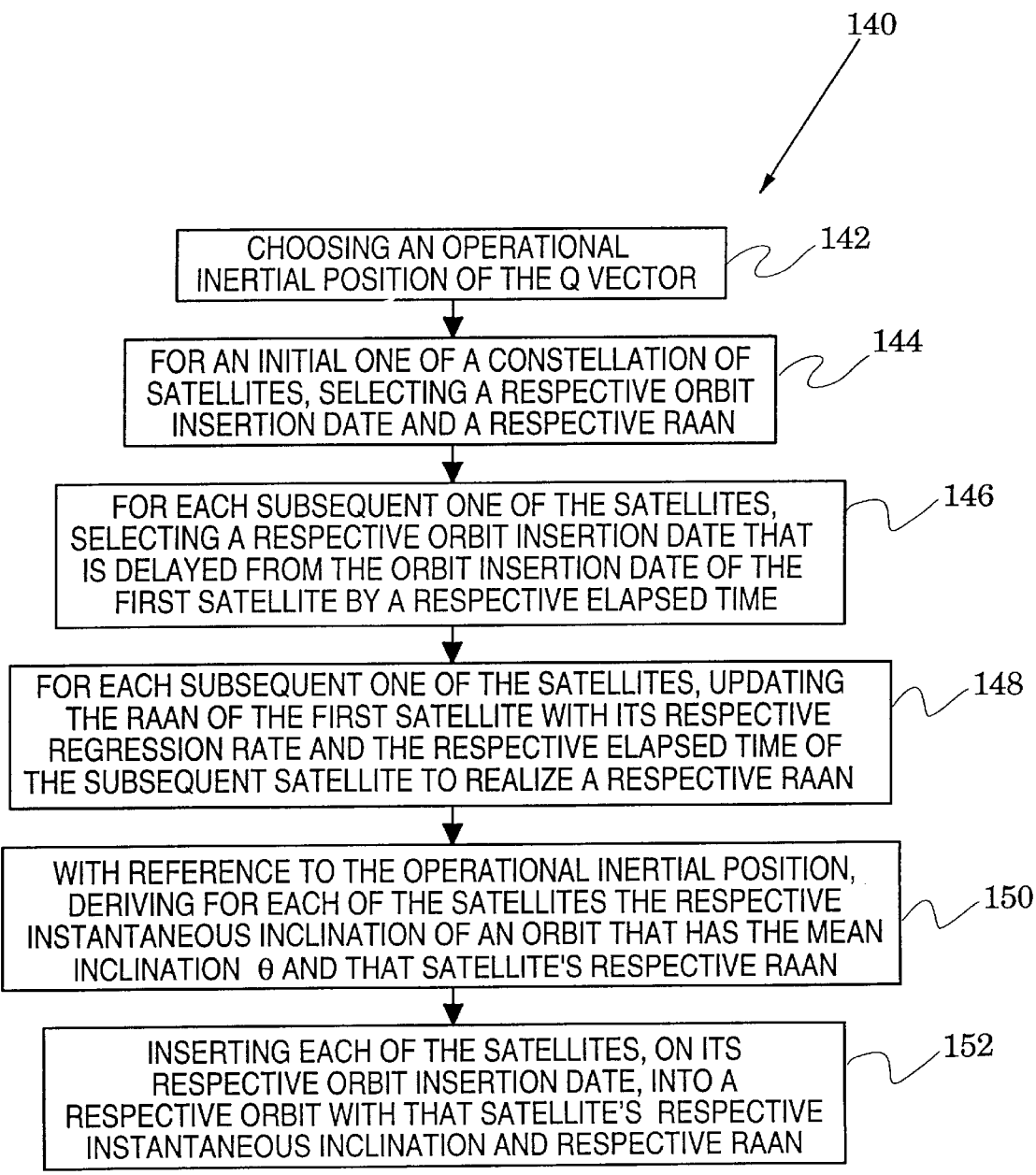
FIG. 10 is a flow chart that illustrates exemplary process steps of the present invention.

These method teachings are illustrated in the flow chart 140 of FIG. 10 which is directed to the insertion of a constellation of satellites into a common orbit plane that has a mean inclination θ. The chart begins with process step 142 in which an operational inertial position of the Q vector is chosen (i.e., an inertial position for conducting the remaining operational steps). In some practices of the invention, it may be accurate enough to use an average inertial position of the Q vector over its 18.6 year period (i.e., a central position inside the path 96 of FIG. 6).

For greater accuracy, the actual inertial position (i.e., along the path 96 of FIG. 6) of the Q vector at each significant date of the method is used. For some satellite applications, the Q vector's position may not significantly change over the time span of orbit insertions. In these cases, a suitable operational position may be an average of the actual position of the Q vector over a time span beginning with the orbit insertion of an initial satellite and ending with the last of subsequent satellites.

In process step 144, a respective orbit insertion date and a respective RAAN are selected for an initial satellite. This initial RAAN might be selected, for example so that the initial satellite is not eclipsed by the earth during its initial orbits so as to enhance its energy supply during this critical period. In a constellation having a highly inclined orbit plane, an initial RAAN of 0°, for example, would avoid eclipses.

For each subsequent satellite, a subsequent orbit insertion date is selected in process step 146 that is delayed from the initial orbit insertion date by a respective elapsed time. In process step 148, the RAAN of the initial satellite is updated with the regression rate (e.g., that rate shown in FIG. 5) and each subsequent satellite's respective elapsed time to realize a respective subsequent RAAN. This step essentially locates the initial orbit normal at the orbit insertion date of subsequent satellites.

Process step 150 is conducted with reference to the operational inertial position of the Q vector. If, for example, the operational position is the actual Q vector position, then this is its position at orbit insertion time of each subsequent satellite. With reference to this position, a respective inclination is derived for each subsequent satellite that is the instantaneous inclination of an orbit that corresponds to the mean inclination θ of the initial satellite and the updated RAAN of the initial satellite.

For example, if the Q vector has moved to the position 133 of FIG. 8 and the updated RAAN is ~60° (orbit normal at ~300), then the instantaneous inclination should be that of the point 134 in FIG. 7. Use of the updated RAAN will insure that the orbit planes of the initial and the subsequent satellites have a common RAAN. Use of the proper instantaneous inclination will insure that the orbit planes of the initial and subsequent satellites have common instantaneous and common mean inclinations.

Process step 152 then inserts each satellite on its respective orbit insertion date into orbit with that satellite's respective inclination and respective RAAN. Thus, all of the satellites will be orbiting in orbit planes whose mean inclination is the mean 104 in FIG. 7.

Figure 11:
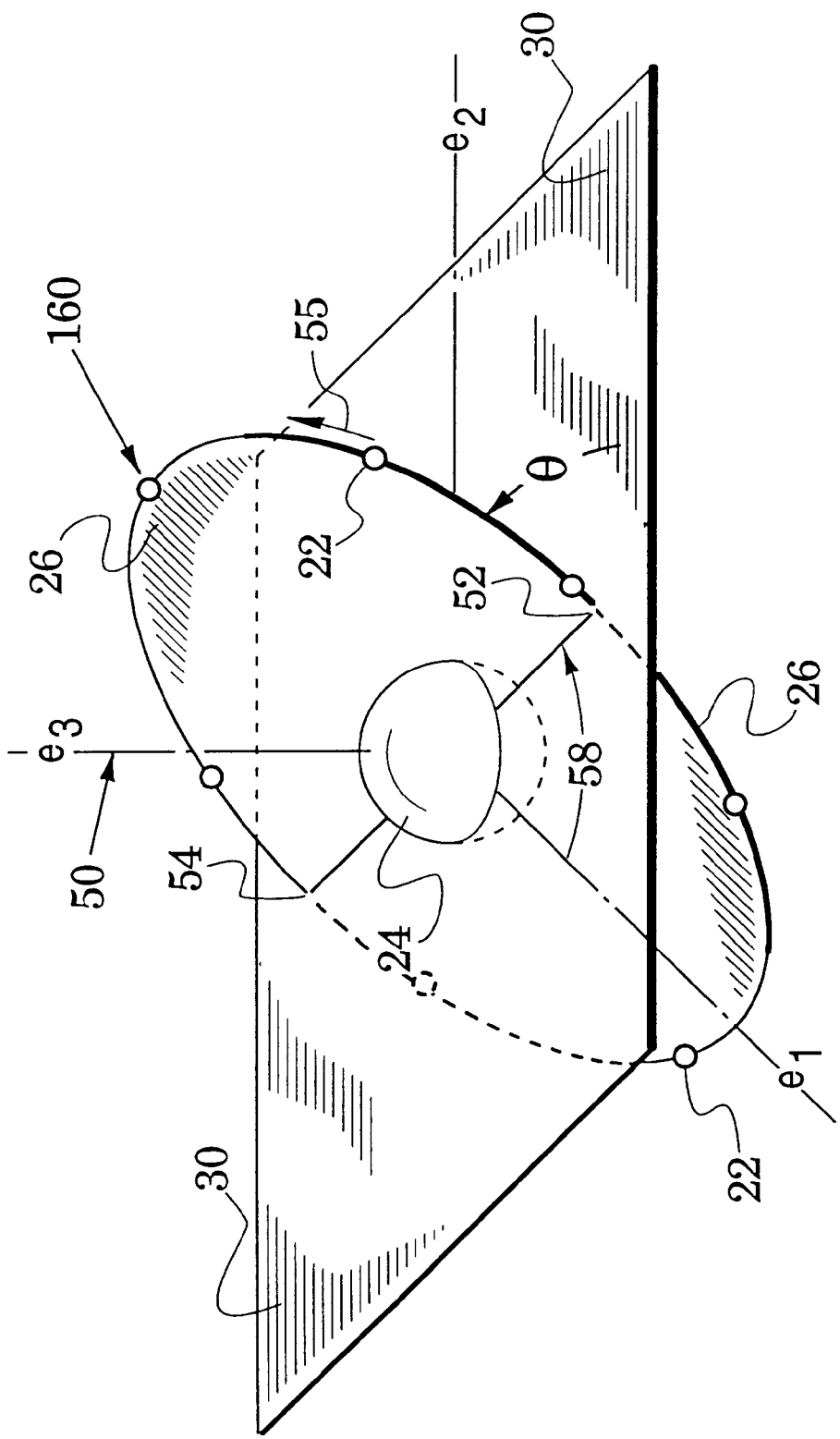
FIG. 11 is a view similar to FIG. 2 which shows a satellite constellation inserted into a common orbit plane that has a mean inclination $\theta$.

FIG. 11 is a view similar to FIG. 3 with like elements indicated by like reference numbers. FIG. 11 illustrates a constellation 160 of satellites 22 that have been inserted into a common orbit plane 26 with a mean inclination θ.

Embodiments of the invention can be implemented with various conventional mathematical techniques. In a first example, the inertial positions of the Q vector, the orbit RAAN's of subsequent satellites and the instantaneous inclinations of initial and subsequent satellites necessary to carry out the process steps of FIG. 10 can be determined by numerical integration.

In a second example, spherical trigonometry can be applied to the spherical triangle 166 defined by the Q vector 60, the orbit normal 28 and the $e_3$ axis in FIG. 8. Application of the law of sines to this triangle produces the equation $$I_s = \cos^{-1}(\cos\gamma \cos\theta + \sin\gamma \sin\theta \cos S), \quad (1)$$

for deriving the instantaneous inclination $I_S$ for subsequent satellites that is specified in process step 150 of FIG. 10. A similar application of the law of cosines yields the equation $$\Omega_s = \sin^{-1}(\sin\theta \sin S/\sin I) + \sigma, \quad (2)$$

for finding the RAAN $\Omega_s$ for subsequent satellites that is specified in process step 148 of FIG. 140.

The RAAN $\Omega_i$ of the initial satellite is chosen based upon various system considerations (e.g., avoiding eclipses during initial orbits). By further application of spherical trigonometry, the instantaneous inclination of the initial satellite (for process step 150 of FIG. 10) can then be found from $$I_i = \cos^{-1}(\cos\theta/\alpha) + \beta, \quad (3)$$

in which $$\alpha = \{1 - (\sin\gamma \sin(\Omega - \sigma)2)\}^{1/2} \quad (4)$$

and $$\beta = ^{-1}(\sin\gamma \cos(\Omega - \sigma)/\cos\gamma). \quad (5)$$

An initial value $S_i$ of the regression angle S can be found from $$S_i = \sin(\Omega - \sigma) \sin I_i / \sin\theta \quad (6)$$

which is a revision of equation (1).

Method teachings of the invention (e.g., as embodied in the flow chart 140 of FIG., 10) have been described as a sequence of process steps. It should be understood that any described sequence is exemplary and various sequence rearrangements can be made in practicing the invention.

Although the method teachings of the invention have been described with reference to an exemplary constellation of 6 hour satellites, they are applicable to satellite constellations of various periods (and, hence, altitudes) and various inclinations. An initial portion of the teachings is also applicable to the accurate insertion of a single satellite into an orbit having a mean inclination θ.

This accurate insertion can reduce the need for thruster corrections of orbit inclination. The accuracy of the methods increases as the altitude of the common orbit is reduced (equivalently, as the period of the common orbit is reduced). In some orbit planes, accordingly, the accurate insertion of the invention may even eliminate the need for thruster corrections.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of accurately inserting a satellite into a common orbit and associated common orbit plane wherein a Q vector corresponds to dimensions of said orbit and repetitively traces a Q vector path with a period of ~18.6 years and said Q vector represents orbit perturbations effected by the earth, the sun and the moon and wherein said common orbit plane has an orbit normal that is tilted from said Q vector by a constant angle and said orbit normal regresses about said Q vector with a regression rate that varies as the product of the cosine of its constant angle and the magnitude of said Q vector and wherein, on an initial date $D_i$, said common orbit plane had an initial instantaneous inclination $I_i$ and an initial RAAN $\Omega_i$, the method comprising the steps of:

selecting a subsequent orbit insertion date $D_s$ that is delayed from said initial date $D_i$ by an elapsed time $T_e$;

updating said initial RAAN $\Omega_i$ with said Q vector path, said constant angle, said regression rate and said elapsed time $T_e$ to realize a subsequent RAAN $\Omega_s$ of said common orbit plane;

from said Q vector path, said constant angle and said subsequent RAAN $\Omega_s$, deriving a subsequent instantaneous inclination $I_s$ of said common orbit plane; and inserting said satellite on said subsequent orbit insertion date $D_s$ into an orbit having said subsequent instantaneous inclination $I_s$ and said subsequent RAAN $\Omega_s$;

deviation, at any selected time, of said common orbit plane and said satellite from a common RAAN and a common instananeous inclination is thereby reduced.

2. The method of claim 1, wherein said updating and deriving steps include the step of determining the inertial positions of said Q vector and said orbit normal.

3. The method of claim 1, further including the step of obtaining said subsequent RAAN $\Omega_s$ and said subsequent instantaneous inclination $I_s$ with the aid of numerical integration.

4. The method of claim 1, further including the step of obtaining said subsequent RAAN $\Omega_s$ and said subsequent instantaneous inclination $I_s$ with the aid of spherical trigonometry.

5. A method of accurately inserting a plurality of satellites into a common orbit and associated common orbit plane wherein a Q vector corresponds to dimensions of said orbit and repetitively traces a Q vector path with a period of ~18.6 years and said Q vector represents orbit perturbations effected by the earth, the sun and the moon and wherein said common orbit plane has an orbit normal that is tilted from said Q vector by a constant angle and said orbit normal regresses about said Q vector with a regression rate that varies as the product of the cosine of its constant angle and the magnitude of said Q vector, the method comprising the steps of:

for an initial one of said satellites, selecting an initial orbit insertion date $D_i$ and an initial right ascension of the ascending node (RAAN) $\Omega_i$;

from said Q vector path, said constant angle and said initial (RAAN) $\Omega_i$, finding an initial instantaneous inclination $I_i$ of said common orbit plane;

on said initial orbit insertion date $D_i$, inserting said initial satellite into an orbit having said initial (RAAN) $\Omega_i$ and said initial instantaneous inclination $I_i$;

for each subsequent one of said satellites, selecting a subsequent orbit insertion date $D_S$ that is delayed from said initial insertion date $D_i$ by a respective elapsed time $T_e$;

for each subsequent one of said satellites, updating said initial RAAN $\Omega_i$ with said Q vector path, said constant angle, said regression rate and said respective elapsed time $T_e$ to realize a respective subsequent RAAN $\Omega_S$ of said common orbit plane;

from said Q vector path, said constant angle and said respective subsequent RAAN $\Omega_S$, deriving for each of said satellites a respective subsequent instantaneous inclination $I_s$ of said common orbit plane ; and inserting each of said satellites on its subsequent orbit insertion date $D_S$ into an orbit having its respective subsequent instantaneous inclination $I_S$ and respective subsequent RAAN $\Omega_S$;

deviation, at any selected time, of said initial and subsequent satellites from a common RAAN and a common instananeous inclination is thereby reduced.

6. The method of claim 5, wherein said finding, updating and deriving steps include the steps of determining the inertial positions of said Q vector and said orbit normal.

7. The method of claim 5, further including the step of obtaining said initial instantaneous inclination $I_i$, said subsequent RAAN $\Omega_S$ and said subsequent instantaneous inclination $I_S$ with the aid of numerical integration.

8. The method of claim 5, further including the step of obtaining said initial instantaneous inclination $I_i$, said subsequent RAAN $\Omega_S$ and said subsequent instantaneous inclination $I_S$ with the aid of spherical trigonometry.

9. The method of claim 5, wherein said selecting step includes the step of specifying said initial RAAN $\Omega_i$ to prevent said initial satellite from being eclipsed by said sun during its initial orbits.

* * * * *